United States Patent [19]

Tippmann

[11] Patent Number: 4,621,504

[45] Date of Patent: Nov. 11, 1986

[54] COOLING METHOD, SYSTEM AND APPARATUS FOR MINIMIZING DEHYDRATION OF FRESH MEAT PRODUCTS AND THE LIKE

[76] Inventor: Robert T. Tippmann, 9837 St. Joe Rd., Fort Wayne, Ind. 46815

[21] Appl. No.: 820,724

[22] Filed: Jan. 21, 1986

Related U.S. Application Data

[62] Division of Ser. No. 727,681, Apr. 26, 1985.

[51] Int. Cl.⁴ .................................................. F25B 5/00
[52] U.S. Cl. ........................................ 62/283; 62/290; 165/181
[58] Field of Search .......................... 62/283, 290, 93; 165/181

[56] References Cited

U.S. PATENT DOCUMENTS

| | | | |
|---|---|---|---|
| 2,251,649 | 8/1941 | Wichmann | 62/290 |
| 3,099,914 | 8/1963 | De Witt et al. | 62/283 |
| 3,759,050 | 9/1973 | Slaasted et al. | 62/290 |
| 4,041,727 | 8/1977 | Maudlin | 62/290 |
| 4,089,188 | 5/1978 | Van Laeys | 62/290 |

Primary Examiner—Ronald C. Capossela
Attorney, Agent, or Firm—Murray and Whisenhunt

[57] ABSTRACT

A method, system and apparatus is disclosed for rapidly cooling and simultaneously maintaining a high moisture content in freshly slaughtered meat products and the like placed in a chamber through which preconditioned air is circulated. This is achieved by limiting the air temperature rise by utilizing air flow rates past the product at a level such as to cause the air to increase in temperature from entry into the chamber to exit from the chamber by no more than approximately two degrees F. and by providing a cooling apparatus which reduces the temperature of the air while removing free water from it yet is capable of maintaining the relative humidity of the air at no less than ninety percent.

10 Claims, 4 Drawing Figures

COOLING METHOD, SYSTEM AND APPARATUS FOR MINIMIZING DEHYDRATION OF FRESH MEAT PRODUCTS AND THE LIKE

This is a divisional application of Ser. No. 727,681, filed Apr. 26, 1985.

BACKGROUND OF THE INVENTION

This invention relates to product cooling and more specifically to a method, system and apparatus for rapidly cooling fresh meat, pork, sheep products or the like to retard bacterial growth thereon while simultaneously minimizing dehydration thereof.

It has long been a problem in the art of processing meat, and the like to simultaneously cool such products at a rate sufficient to prevent the growth of bacteria and at the same time maintain the moisture content of the product at a high level. A high moisture content in such products not only adds greatly to the taste and appearance of such products but the overall weight of the product is greater resulting in a higher price realized when the product is sold by the pound. High moisture content must be achieved without any water contacting the product which would result in its condemnation by inspectors of the United States Department of Agriculture (USDA).

Typically, the carcass of the warm, freshly slaughtered animal is placed or hung in an enclosed room or holding chamber through which refrigerated air is circulated to thereby reduce as rapidly as possible the temperature of the carcass from approximately 100 degrees F. down to approximately 40 degrees F. to stop bacterial growth thereon. Prior art cooling systems are able to achieve this 60 degree F. temperature drop by slowly circulating cool air through the chamber containing the product and through a cooling unit such as a plate fin-type evaporator connected to a conventional refrigeration system. The air would have a relative humidity of approximately 60 percent. The temperature of this slow moving relatively dry air would increase 3 or 4 degrees F. as a result of the heat given off by the product. This 3 or 4 degrees F. temperature rise would then cause the air to have an affinity for moisture which it would take out of the product causing the product to shrink from dehydration. Air having such a 60 percent relative humidity slowly circulated over the product in prior art systems would typically result in shrinkage of the product from dehydration of approximately 0.75 percent if the product was beef and 1.5 percent if the product was pork.

In such prior art systems the air passing through the cooling unit was typically cooled to approximately 28 degrees F. and then circulated over the product where it picked 3 to 4 degrees F. and was then returned to the cooling unit with a temperature of approximately 32 degrees F. The air was passed through the cooling unit at approximately 500 feet per minute and the water was removed therefrom while keeping the relative humidity at approximately 60 percent as aforementioned. To reduce the temperature of the air in the plate fin-type evaporator this 3 or 4 degrees F. prior to its discharge back into the chamber required the refrigerant passing through the evaporator to be low or approximately 13 degrees F. and required approximately 1.2 horsepower per ton to thus cool the air. A higher velocity of air through the plate fin-type evaporator of the prior art was not achievable without an excessive amount of free water being entrained therein which would then settle on the product resulting in its condemnation as aforementioned.

Applicant discovered that if the velocity of the air being circulated over the product and through the cooling unit is very high, the air would pick up less heat, for example, only 1.5 to 2.0 degrees F., from heat given off by the product before the air is returned to the cooling unit. This low temperature increase is insufficient to cause the air to crave moisture thus less moisture is taken out of the product. In addition because of this low increase air temperature, the cooling unit requires less energy consumption to remove this heat from the air prior to its recirculation back to the chamber holding the product. Thus, the refrigerant passing through the evaporator cooling coils of the cooling unit can be at a higher temperature than that of the prior art, for example, approximately 28 degrees F. At this 28 degrees F. refrigerant temperature, the cooling coils of the evaporator run "wet", thus less moisture is removed from the air passing over them and applicant is able to maintain the relative humidity of the air circulating over the product at between 90 and 100 percent which further reduces absorption of moisuture from the product. Applicant's novel air diffuser design adjacent the cooling coils of the cooling unit insures that all free, entrained water is removed from the moisture ladened air so as not to fall on the surface of the product. Operation of applicant's system has resulted in dehydration or shrinkage of only 0.25 percent if the product were freshly slaughtered beef and 0.50 percent if the product were pork. As can readily be seen, this is only one-third of the shrinkage of the product experienced by the prior art methods.

This energy savings and reduction in the shrinkage of the product is achieved by applicant's use of a spiral wrap fin-type evaporator or cooling means in the refrigeration system which includes the air diffuser of applicant's novel design. The cooling system will be described in detail later. It is sufficient to say at this point, however, that applicant's diffuser design permits air to be forced past or over the cooling coils in the evaporator at a face velocity of between 800 and 1,000 feet per minute and exit with a very low free, entrained water content but with a relative humidity of between 90 and 100 percent as aforestated. Because the cooling coils of the evaporator are run "wet", that is, passing refrigerant through them having a temperature of approximately 28 degrees F., only 0.9 horsepower per ton to cool the air is required or a 0.3 horsepower per ton savings over the prior art systems. The air thus rapidly recirculated by applicant's system is only heated a maximum of 2 degrees F. before being returned to the evaporator for recooling contrasted with a prior art difference of 4 degrees F. as aforementioned.

Thus, applicant's novel cooling system to be hereinafter described in detail not only results in less weight loss or shrinkage due to dehydration of the product, it achieves this result consuming less power than the prior art cooling systems.

It is therefore the primary object of the present invention to provide a superior method and apparatus for minimizing dehydration of freshly slaughtered meat products and the like and do it with less electrical power consumption.

It is another object of the present invention to provide a method and apparatus for accomplishing the stated purpose which maintains a high degree of relative humidity in the cooled air but a low entrained or free water content.

It is yet another object of the present invention to provide a method and apparatus for accomplishing the stated purpose which has a cooling means that is capable of moving air through it at a very high face velocity and recirculating it rapidly over the meat product resulting in less heat and thus less moisture being given up by the product.

It is a further object of the present invention to provide an extremely efficient air cooling means having a novel air diffusing device incorporated therein.

These and other objects and purposes of this invention will be understood by those acquainted with the design and construction of such methods and apparatus upon reading of the following specification and accompanying drawings.

DETAILED DESCRIPTION OF PREFERRED EMBODIMENTS

Figure 1:
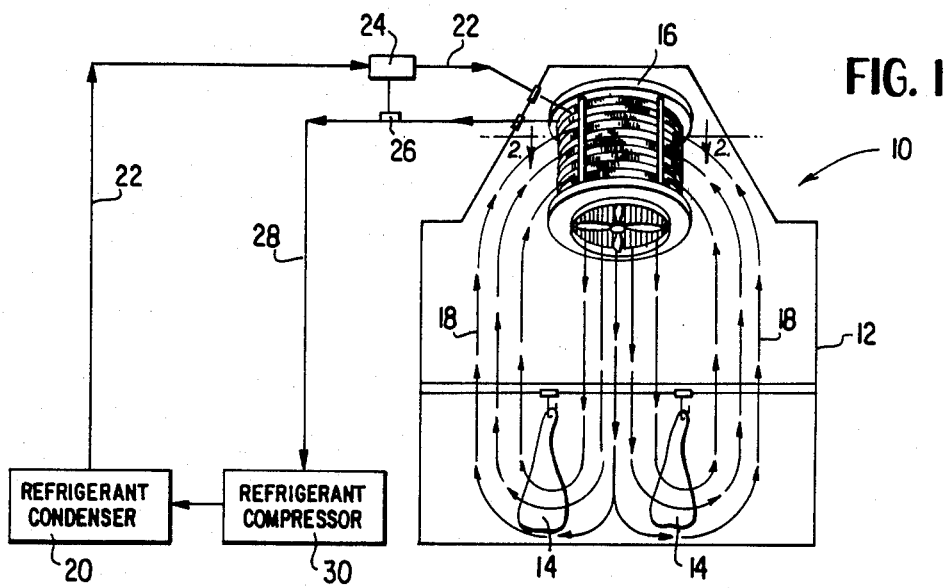
FIG. 1 is a digrammatic illustration of the refrigeration system and cooling apparatus of the present invention.

Referring now to the drawings where like characters of reference depict like elements in each of the several figures, numeral 10 in FIG. 1 denotes generally the cooling system of the present invention for rapidly cooling products such as freshly slaughtered beef, pork, sheep or the like while simultaneously minimizing their dehydration. The cooling system 10 includes a controlled environment chamber or holding room 12 in which the product, for example, several freshly slaughtered beef carcasses 14 are hung to be cooled.

A refrigerant evaporator 16 is located adjacent the ceiling of the holding room 12 above the product 14 to provide forced circulation of cooled air 18 out of the evaporator 16 (see arrows) down over and around the product 14 and back to the evaporator 16. Liquid refrigerant is supplied from a condenser 20 to the evaporator 16 through liquid pipe line 22. A conventional thermostatic expansion valve 24 having a thermostat bulb 26 is also provided in contact with the suction line 28 for controlling the temperature of the system. The suction pipe line 28 is, in turn, connected to a refrigerant compressor 30 which compresses the refrigerant gas and delivers it to the condenser 20 to complete the cycle in a well known manner.

Figure 2:
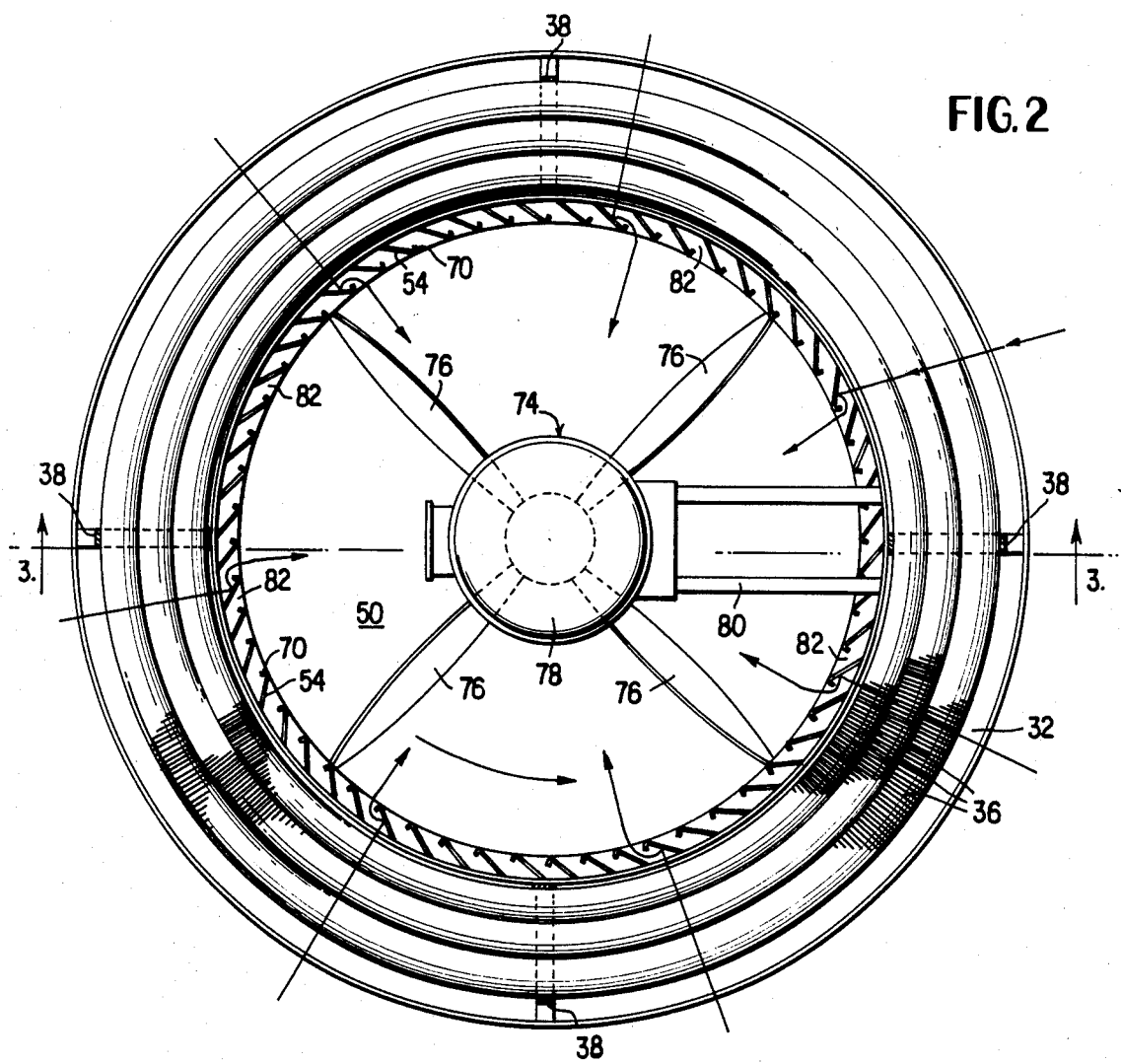
FIG. 2 is a cross-sectional view of the cooling apparatus and diffuser taken along the lines 2—2 of FIG. 1 with the cooling coil shown schematically except where the cooling coil fins are illustrated.
Figure 3:
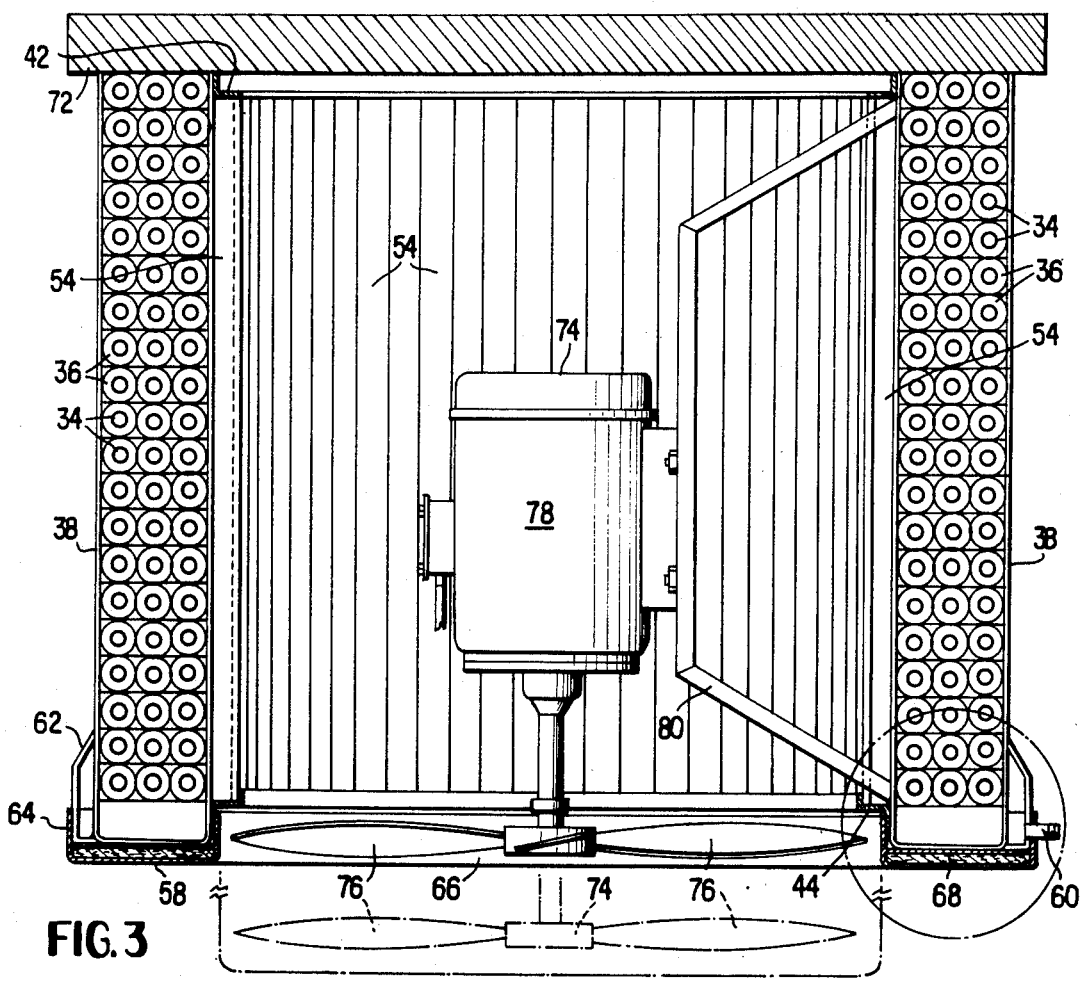
FIG. 3 is a cross-sectional view taken along the lines 3—3 of FIG. 2.
Figure 4:
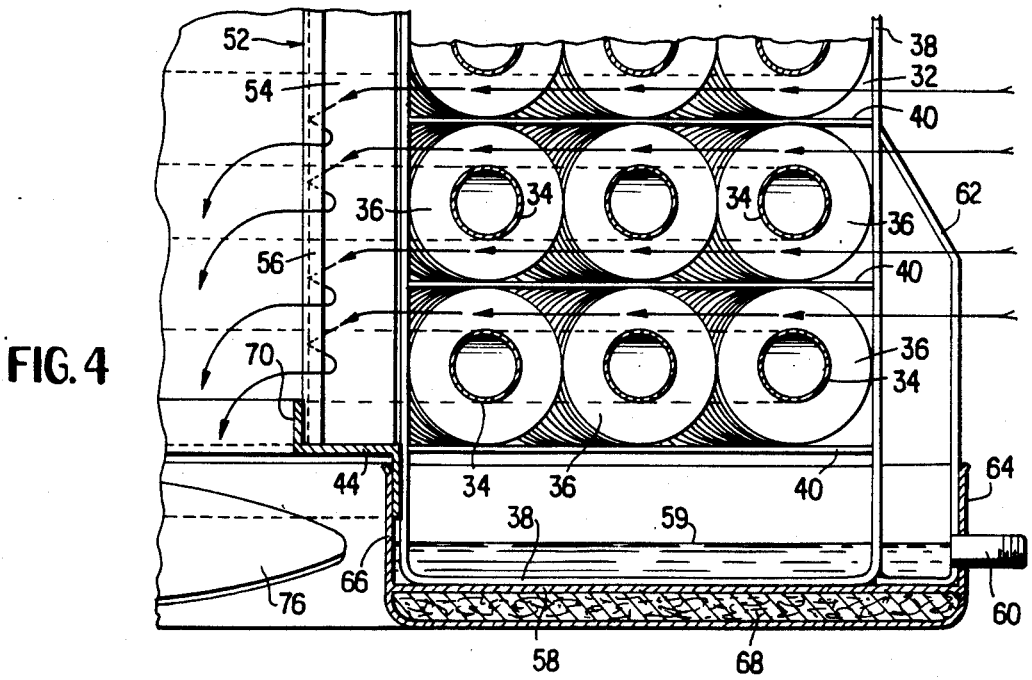
FIG. 4 is an enlargement of the structure encircled in FIG. 3.

Referring now to FIGS. 2-4, the evaporator 16 or the present invention is shown as having a core 32 comprising a plurality of cooling coils or rows of tubes 34 each row having three spirally wound loops. The loops of each row are serially connected so as to provide a single tube passage through the core. The tubes 34 are supplied with a multiplicity of closely spaced fins 36 located on the tubes thus enabling heat to be transferred by the core more efficiently. Rectangular shaped brackets 38 are provided at spaced-apart locations around the outside of the core 32 to keep the tubes 34 in one row in vertical alignment with the tubes 34 in an adjacent row.

Spacers 40 are also provided beneath each row of tubes 34 to support the tubes. The spacers 40 are connected at their ends to the interior sides of the brackets 38. Upper and lower circular flanges 42,44, respectively, L-shaped in cross-section are provided adjacent the top 46 and bottom 48 of the core 32 as viewed in FIG. 3. The flanges 42,44 are secured to the brackets 28 and serve to define, together with the inner-most tubes 34 of each row, a cylindrical-shaped, open, interior area 50.

An air diffuser 52 is provided adjacent the inner-most tubes 34 of each row. The air diffuser 52 consists of a plurality of vertically extending, parallel, spaced-apart baffle plates 54 which extend between and are secured at their ends to the upper and lower circular flanges 42,44. The baffle plates 54 all extend in the same relative direction around the circular flanges 42,44 as can best be seen by referring to FIG. 2. Each baffle plate 54 has a longitudinally extending lip or flange portion 56 on the edge thereof furthest from the inner-most tubes 34 of each row for penetrating water on the baffle plates 54 from being blown into the open air 50. The baffle plates 54 serve the dual function of first aligning the air passing between the plates into substantially parallel streams which are then drawn downward through the lower flange 44 by a fan as will be more fully described later. Secondly, the baffle plates 54, due to their overlapping arrangement, provide a surface for any free water entrained in the air to impinge thus separating the water out of the air. This free entrained water is primarily condensation which forms on the tubes 34 and fins 36 and is blown therefrom by the rapidly moving air being drawn over the tubes and fins toward the baffle plates 54.

A circular condensate collecting pan 58 is provided beneath the core 32 for receiving the aforementioned condensate 59 and draining it away in a pipe 60. A plurality of spaced-apart brackets 62 are secured to the outside of brackets 38, as can best be seen in FIG. 4, which serve to support the outer wall 64 of the pan 58. The inner wall 66 of the pan 58 is secured to the lower circular flange 44. The pan 58 also has a layer of insulation 68 adjacent the bottom thereof for preventing condensation from forming on the outside surface of the bottom and dripping therefrom. A vertically extending wall 70 is secured to the lower circular flange 44 to insure that water running down from the baffle plates flows over the upper surface of the lower circular flange 44 and into the pan 58 and not into open area 50. A hood or cover 72 is positioned on the top 46 of the core 32 and encloses the upper opening of the interior 50.

A fan 74 having a plurality of blades 76 is driven by an electric motor 78 which in turn is mounted by support arms 80, in the interior area 50 of the core 32. The fan 74 serves to draw air from outside of the core 32, see arrows in FIG. 4, over the tubes 34 and fins 36 toward the baffle plates 54 of the air diffuser 52. Any water or condensate blown off of the tubes 34 or fins 36 is entrained in the air and is drawn into engagement with the baffle plates 54 where it adheres and is forced toward lips 56 from which it flows down into pan 58 as aforedescribed. The air, however, tends to curve around the lips 56 of the baffle plates 54 and through the gaps 82 between the baffle plates 54. The water being heavier does not bend and thus is propelled onto the sides of the baffle plates 54. As the air enters the interior 50, it is rotating clockwise, as viewed in FIG. 2, and is then bent downward and is drawn by the fan 74 as a mass substantially normal to the plane of the fan blades 76. Applicant discovered that rotating the fan blades 76 in a direction opposite to the direction in which the baffle plates 54 extend toward the interior 50 or counterclockwise as viewed in FIG. 2 that the blades 76 are better able to "bite" the downward body of air thus greatly improving the efficiency of the fan 74. In effect, the air diffuser 52 acts as an "air straightener" or "air aligner" which forces all of the air exiting the gaps 82 to rotate in the same direction. By then rotating the fan blades 76 in a direction opposite thereto, approximately one-third of the loss in air flow resulting from the pressure drop across the diffuser 52 can be recovered. The speed of fan 74 and blade pitch is chosen to cause the velocity of the air passing over the surface of the tubes 34 and fins 36 to be between 800 and 1,000 feet per minute.

A hollow, cylindrical-shaped extension member 84, shown in phantom lines in FIG. 3, may be added beneath the pan 58. The fan 74 is positioned in the extension member 84 adjacent the lower open end thereof. This modification would insure more complete alignment of the air from the gaps 82 prior to the airs engagement with the fan blades 76 as well as to discharge the cooled air closer to the product.

Applicant's method of system operation has as its object, as aforementioned, the rapid cooling of carcasses of meat products to retard bacterial growth thereon while simultaneously reducing dehydration of the product to levels substantially below those realized by prior art methods.

Typically, meat in the form of beef, pork, or sheep carcasses 14 is hung overnight after daily slaughter operations in a large, precooled, controlled environment chamber containing a plurality of zones or groups each containing twenty or so carcasses. After a retention time of between 14–24 hours, and with cooled air from a cooling unit continuously recirculated over the carcasses at a temperature of approximately 32 degrees F., the carcasses themselves achieve a temperature of approximately 40 degrees F. The next day, zones of carcasses are removed from the chamber for shipment, slaughter operations are resumed, and freshly slaughtered meat having a temperature of between 100-102 degrees F. is brought into the chamber to refill the vacated zones.

Air 18 from the cooling unit 16 is delivered to the chamber 12 and rapidly circulates around the meat. The temperature of the air leaving the chamber 12 is maintained between 30-50 degrees F. and preferably between 32-48 degrees F. The air 18 entering the chamber 12 has a relative humidity of no less than 90 percent and with no visible free water present therein. The air 18 is circulated or drawn over the meat by fan 74 sufficiently rapidly so that the temperature of the air only rises between 1.5 and 2 degrees F. from heat given off by the meat before it is returned to the cooling unit 16. As a result of the high humidity of this air and the fact that the temperature of the air is only able to rise between 1.5 to 2 degrees F. due to its rapid circulation over the meat rather than the 3 to 4 degrees F. of the prior art, the air has hardly any affinity for moisture and thus shrinkage of the meat is less than one-third of that realized in systems of the prior art.

The heated air 18 is then drawn back into the cooling unit and is passed over the cooling coils 32 contained therein at a velocity of no less than 800 feet per minute and preferably between 800 and 1000 feet per minute by the fan 74. The refrigerant circulated through the cooling coils 32 from the compressor 30 and condensor 20 of the cooling unit 16 is set high or approximately 28 degrees F. so that the coils run "wet", i.e., less moisture can be taken out of or is removed from the air by the coils than if the refrigerant temperature were run low as is the case in the prior art systems. The temperature drop across the cooling unit 16 from the inlet to the outlet is held at 2 degrees F. or less by controlling the refrigerant temperature. Thus, the temperature of the air leaving the cooling unit 16 and entering the chamber 12 is maintained 2 degrees F. less than the aforementioned temperature of the air leaving the chamber 12 and entering the cooling unit 16.

The cooled air, after it is drawn over the cooling coils 32, enters the diffuser 52 wherein all free, entrained water is removed from the air so as not to settle on the meat which would lead to its condemnation. Free water is defined here to mean water in the air that is visible to the naked eye.

The thus cooled air is then returned to the chamber 12 having the aforesaid high relative humidity and the process continually repeats itself. Because these refrigeration systems are usually in continuous operation, the monetary saving in electrical costs utilizing applicant's system is substantial. Additional monetary gain is achieved utilizing applicant's novel method, system and apparatus in addition to the aforementioned energy savings due to the increased sale price of the product obtainable that results from its increased weight due to one-third less shrinkage from dehydration than the prior art systems.

Various changes and modifications may be made to the method, system and apparatus of the present invention as will be readily apparent to those skilled in the art. Such modifications and changes are within the scope and teaching of this invention as defined by the claims appended hereto.

What is claimed is:

1. An air cooling apparatus comprising:
    (a) a plurality of spirally wound, serially connected rows of refrigerant coils forming an evaporator having an open interior;
    (b) means for supporting said coils in a stack;
    (c) upper and lower flange means connected to said support means adjacent the ends of said stack around said hollow interior;
    (d) diffuser means having a plurality of spaced-apart baffle means extending between said upper and lower flange means and parallel to each other, said baffle means being secured at the ends thereof to said upper and lower flange means, each of said baffle means extending from said coils to said interior and having a longitudinally extending lip adjacent one edge thereof to catch and divert entrained water blown from said coils;
    (e) motor driven fan means having fan blades connected thereto for drawing air over said coils and between said baffle means; and
    (f) pan means secured to said support means beneath said coils and said baffle means to collect water flowing therefrom for disposal.

2. An air cooling apparatus as set forth in claim 1 wherein said motor driven fan means is caused to rotate said fan blades in a direction opposite the direction in which said baffles extend to thereby increase the efficiency of said fan blades.

3. An air cooling apparatus as set in claim 1 wherein said motor driven fan means is mounted in said open interior of said refrigerant coils and said fan blades are positioned adjacent said lower flange means.

4. A system for cooling freshly slaughtered meat and the like to reduce the growth of bacteria thereon while minimizing moisture removal from said meat, said system comprising:
   (a) a controlled environment chamber for holding at least one freshly slaughtered meat carcass;
   (b) fan means for circulating air through said chamber and around said carcass at a flow rate past said carcass sufficient to limit the increase of the temperature of said air from entry into said chamber to exit from said chamber to two degrees F.;
   (c) cooling means including cooling coils for reducing the temperature of said air exciting said chamber as it passes over said cooling coils but maintain the relative humitidy of said air to at least 90 percent, and
   (d) diffuser means for removing free water from said air as it leaves said cooling coils and before said air is reintroducted into said chamber to below the visible range.

5. A system as set forth in claim 4 wherein said fan means draws said circulated air over said cooling coils at a velocity of at least 800 feet per minute.

6. A system as set forth in claim 4 wherein said fan means draws said circulated air over said cooling coils at a velocity of between 800 and 1,000 feet per minute.

7. A system as set forth in claim 4 wherein said diffuser means has a plurality of parallel, spaced apart baffle means adjacent said cooling coils and extending in the same circular direction for removing said free water from said air passing over said cooling coils.

8. A system as set forth in claim 7 wherein said fan means is rotated in a direction opposite to the circular direction in which said baffle plates extend.

9. A system as set forth in claim 4 wherein said cooling coils have a refrigerant passing therethrough and the temperature of said refrigerant is no less than 28 degrees F.

10. A system as set forth in claim 4 wherein said cooling means maintains the relative humidity of said air passing therethrough between 92 and 100 percent.

* * * * *